United States Patent [19]
Chen et al.

[11] Patent Number: 5,116,630
[45] Date of Patent: May 26, 1992

[54] PROCESS FOR THE DEAGGLUTINATION OF NATURAL GLUTEN AND DIETARY PRODUCTS CONTAINING LARGE QUANTITIES OF WHEAT GLUTEN

[76] Inventors: John S. Chen; Maria G. Menesini Chen, both of Strada di Renaccio 11, I-53100 Siena, Italy

[21] Appl. No.: 449,945
[22] PCT Filed: May 19, 1988
[86] PCT No.: PCT/IT88/00036
  § 371 Date: Nov. 15, 1989
  § 102(e) Date: Nov. 15, 1989
[87] PCT Pub. No.: WO88/09129
  PCT Pub. Date: Dec. 1, 1988

[30] Foreign Application Priority Data

May 20, 1987 [IT] Italy ............................ 65502 A/87

[51] Int. Cl.$^5$ ............................................ A21D 13/00
[52] U.S. Cl. .................................... 426/549; 426/496; 426/520; 426/656
[58] Field of Search ................ 426/549, 496, 520, 656

[56] References Cited

U.S. PATENT DOCUMENTS 2,478,099 1/1947 Hennessy ........................ 426/549
2,631,379 3/1953 Slotter et al. ...................... 426/517

FOREIGN PATENT DOCUMENTS 2019188 10/1979 United Kingdom .

OTHER PUBLICATIONS

Schultz, H. W. and Anglemier, A. F., Symposium on Foods: Proteins and their Reactions, 1964, p. 335, AVI Publishing Conn., Westport, CT.
Feeney, R. E. and Whitake, J. R., Food Proteins Improvement through Chemical and Enzymatic Modification, 1977, p. 159, American Chemical Society, Washington, D.C.

*Primary Examiner*—Joseph Golian
*Assistant Examiner*—Leslie Wong
*Attorney, Agent, or Firm*—Laurence R. Brown

[57] ABSTRACT

This invention provides a process for the deagglutinaton or denaturation of natural gluten and dietary products containing large quantities of wheat gluten. New dietary products containing large quantities of wheat gluten are disclosed. The formulation is based on the principle of the poor hydrolytic activity of pepsin and tripsin in cooked gluten to provide a dietary and product. A process for the denaturation of natural gluten is also disclosed which heats gluten at temperatures below 110+ C.

5 Claims, No Drawings

PROCESS FOR THE DEAGGLUTINATION OF NATURAL GLUTEN AND DIETARY PRODUCTS CONTAINING LARGE QUANTITIES OF WHEAT GLUTEN

TECHNICAL FIELD

This invention relates to a process of deagglutination or denaturation of natural gluten.

BACKGROUND ART

Bread and spaghetti consumption in Italy today is calculated as 50% of the average total caloric ration for an adult (Enciclopedia Medica, USES, Edizione Scientifica, Edit. 1973, pages 1123-1138).

Wheat flour which contains 8-13% of protein is the principal ingredient and the rest (87-92%) is mostly starch and organic and inorganic compounds.

While starch supplies the most calories, the utilization of proteins (above all gluten, which represents 80-85% of total wheat endoplasmatic proteins) by the organism is still unclear (Hove, E. L. and Harrel, C. G., Cereal Chem., 20, 141, 1943: Bricken, M. et al, J. Nutr. 30, 296, 1945; Floridi, A e Fidanza, F. in Seminario sulle Metodologie di Valutazione della Qualita Biologica delle Proteine, CNR, page 67, 1978; Osborn and Mandal, J. Biol. Chem. 20, 351, 1915, 22, 241, 1915).

Recent studies on the digestion of gluten by proteases from different sources have clarified some fundamental aspects-for a better understanding of this protein (Menesini Chen, M. G. et al in Congr. Naz. della SIB, page 189, 1986; Chen, J. S. et al in. "IPRA Third Sub Project: Conservation and Processing of Foods-A Research Report (1982-1986)", CNR, Roma, pages 207-209, 1986; Menesini Chen, M. G. et al, Abst. in 33° Cong. Naz. SIB, Brescia Gardone Riviera, 26-28/09/87, page F6, 1987; Pagani, S. et al, ibid., page F5, 1987). Some results of this research published elsewhere as well as already known data (Chen, J. S. et al in Use of Enzyme in Food Technol., ed. P. Dupuy, Lavoisier, Paris, page 389, 1982; Italian Patent Appln. No. 49557A/82; Menesini Chen, M. G. et al in "Aggiornamenti sull'Impiego di Preparazioni Enzimatiche nell-'Industria Alimentare N° 22", Edit. G. F. Montedoro, 1988, IPRA del CNR, Roma, pages 279-288) have suggested to us that the proteases of mammalian origin such as pepsin and tripsin (swine) have scarse proteolytic activity on wheat gluten above all when cooked (see also Hansen, L. P. et al in Protein Nutritional Quality of Food and Feeds, Edit. Mendel Friedman, Part 2, Marcel Dekker, Inc., New York, pages 393-415, 1975).

SUMMARY OF THE INVENTION

We have now found, surprisingly, that foods with a high wheat gluten content have a considerable dietary value. The value of this aliment is based on the fact that with the addition of gluten to paste the quantity of starch is reduced. This modification should be regarded as advantageous in low calorie diets. The incomplete utilization in the body of cooked (or heat treated) gluten will allow these protein matrices to remain longer in the stomach thus producing less calories and making it the best diet for obese persons. The same aliment would be ideal for people restricted to semolina or glutinated paste diets (there are only about 2 in 1000 who suffer from celiac diseases, see Kasarda, D. D., in Protein Nutritional Quality of Food and Feeds, Part 2, Edit. Menden Friedman, Marcel Dekker, Inc., New York, pages 565-594, 1975). It is evident that this aliment is a perfect solution for normal healthy individuals who desire to maintain body weight without renouncing noodles and paste products.

Accordingly, it is a first object of the present invention to provide a process for treating natural gluten to be used in the formulation of dietary products containing gluten. The process of the invention can render the natural gluten become less digestible by the proteases such as pepsin, trypsin and other microbial proteinases. Since this same process also causes the gluten to lose completely or partially the capacity to agglutinate, we will refer to the process of the present invention as a "deagglutination" or denaturation process. However, in this context, either term identifies the loss by the gluten molecule of some chemical-physical and enzymatic properties. The process of the invention is designed to enhance the dietary properties of the gluten in the formulation of dietetic products having a high gluten content as well as to improve the elastic properties (and therefore the workability) of the paste in which the "deagglutinated" gluten is added.

It is a second object of the present invention to provide dietary products having a high content of natural gluten and/or gluten preliminarly deagglutinated with the deagglutination process of the invention.

It is a third object of the present invention to provide dietetic aliments comprising natural gluten and/or gluten preliminarly deagglutinated with the process of the invention. The gluten may be used as a substrate or filling to be mixed with other substances such as starch, fiber, milk, animal and vegetable proteins, or homogenized products in general.

According to the deagglutination process of the invention, the natural gluten is heated to a temperature lower than 110° C.

The following non-limiting examples further illustrate the process for the deagglutination of natural gluten according to the invention.

EXAMPLE 1

Complete deagglutination 2 kg of gluten is introduced into a 15 l rolling cylindrical container which is then heated to a temperature between 95° and 110° C. for at least 75 minutes.

The final product is darker than natural gluten. The odor is similar to that of biscuits.

The hydrolysability (digestibility) of the product by using a fungal proteinase as enzyme (E) and Super gluten 80 (IGP) as a control Substrate (S) is measured as between 40-60% od control value.

EXAMPLE 2

Partial deagglutination

The procedure of Example 1 is followed, but with a temperature from 60° to 94° C. for at least 75 minutes.

The final product is similar to natural gluten in colour and odour. The hydrolysability of the product is between 61-99% of the control.

Wheat flour to be used for producing paste, bread, cakes can thus be enriched with both natural and/or deagglutinated gluten.

During the hydration of wheat flour the quantity of gluten effectively added must be in proportion to the liquid added, in order to obtain an optimal dough. For example, about 0.34 l of liquid must be added per kg of additional gluten.

This precaution must be observed in the production of new aliments and consequently the new products might be classified as follows.

A) For the production of paste:
a) paste containing natural gluten up to 26%
b) paste containing natural gluten up to 26% and/or deagglutinated gluten up to 85%.

B) For the production of bread:
c) bread prepared with natural gluten up to 26%
d) bread prepared with natural gluten up to 26% and/or deagglutinated gluten up to 85%.

c) e) cakes containing natural and/or deagglutinated gluten up to 85%.

It is emphasized that these new products which use wheat gluten as raw material can be considered completely safe natural dietary aliments because cereals, for thousands of years, have supplied the principal calories and proteins for mankind.

The physical properties of these products are the following.

For alimentary paste (A), while in general gluten is responsible for the formation of an elastic-cohesive mass when hydrated. It has an increasing elasticity or resistance in proportion to the increased gluten content in A) a), and the odor and the color of these products are similar to those of the paste now on the market, while for the products A) b) the elasticity/resistance and the odor are more or less similar to the paste made with semola from hard wheat, but the color becomes darker in proportion to the quantity of deagglutinated gluten present. Cooking properties of the products A) b) are improved.

For the products B) c), the variations in elasticity/resistance together with that of odor and color are typical of the raw material used in proportion to the quantity of gluten added. As for B) d), there is no substantial variation in elasticity/resistance or odor. The darker color depends on the quantity of deagglutinated gluten present in the product.

For the products C) e), the odor of gluten is more accentuated when natural gluten is used, but in the case of enrichment with deagglutinated gluten the product is darker in proportion to the quantity of deagglutinated gluten added.

In short, as described above, the products will vary in color and odor in proportion to the quantity of natural or deagglutinated gluten added but the appearance, taste and flavor should not undergo substantial variations.

We claim:

1. Process for treating natural gluten to be used in the formulation of less digestible dietary products containing gluten, said process comprising:
   a) providing a quantity of natural gluten; and
   b) heating the natural gluten to a temperature between 60° and 110° C. for at least 75 minutes for denaturating the natural gluten to render it into a less digestible by proteinases product.

2. Process according to claim 1, wherein the natural gluten is heated to a temperature of from 95° C. to 110° C.

3. Process according to claim 1, wherein the natural gluten is heated to a temperature of from 60° C. to 94° C.

4. Dietary less digestible products prepared with wheat flour wherein the products contain up to 85% of gluten denatured by heating the wheat flour to a temperature between 60° C. and 110° C. for at least 75 minutes.

5. Dietary products according to claim 4, wherein the products are formed from a wheat flour based dough and during preparation of the dough about 0.34 liter of liquid is added per kg of gluten for optimal dough formation.

* * * * *